United States Patent
Miller et al.

(10) Patent No.: US 8,072,437 B2
(45) Date of Patent: Dec. 6, 2011

(54) FLEXIBLE MULTITOUCH ELECTROLUMINESCENT DISPLAY

(75) Inventors: Michael E. Miller, Honeoye Falls, NY (US); John W. Harner, Rochester, NY (US)

(73) Assignee: Global OLED Technology LLC, Herndon, VA (US)

( * ) Notice: Subject to any disclaimer, the term of this patent is extended or adjusted under 35 U.S.C. 154(b) by 343 days.

(21) Appl. No.: 12/547,746

(22) Filed: Aug. 26, 2009

(65) Prior Publication Data

US 2011/0050586 A1    Mar. 3, 2011

(51) Int. Cl.
    *G06F 3/038* (2006.01)

(52) U.S. Cl. .......................... 345/173; 345/76; 345/211

(58) Field of Classification Search .................. 345/173, 345/211, 76
    See application file for complete search history.

(56) References Cited

U.S. PATENT DOCUMENTS

| | | | |
|---|---|---|---|
| 4,769,292 A | 9/1988 | Tang et al. | |
| 5,061,569 A | 10/1991 | Vanslyke et al. | |
| 6,861,155 B2 | 3/2005 | Bawendi et al. | |
| 7,169,652 B2 * | 1/2007 | Kimura | 438/149 |
| 7,196,694 B2 | 3/2007 | Roberts | |
| 7,478,569 B2 | 1/2009 | Bossi et al. | |
| 7,973,472 B2 * | 7/2011 | Cok | 313/506 |
| 2003/0218598 A1 * | 11/2003 | Shibata | 345/161 |
| 2006/0238494 A1 | 10/2006 | Narayanaswami et al. | |
| 2007/0057263 A1 | 3/2007 | Kahen | |
| 2007/0103349 A1 | 5/2007 | Liu et al. | |
| 2008/0158171 A1 | 7/2008 | Wong et al. | |
| 2008/0180399 A1 | 7/2008 | Cheng | |
| 2009/0146967 A1 | 6/2009 | Ino et al. | |

FOREIGN PATENT DOCUMENTS

EP    1 471 459 A2    10/2004
WO    2010/091380 A1    8/2010

* cited by examiner

*Primary Examiner* — Van Chow
(74) *Attorney, Agent, or Firm* — Morgan, Lewis & Bockius LLP (57) ABSTRACT

A display device including a touch sensitive EL display having a flexible substrate; one or more power busses and one or more EL elements disposed over the flexible substrate; and a plurality of distributed chiplets arranged so that at least two chiplets are associated with each of a plurality of touch sensitive areas on the EL display and for sensing stress or strain associated with bending of the flexible substrate or the chiplet substrate to provide respective displacement signals corresponding to the touch sensitive areas; each chiplet connected to one or more of the power busses and one or more of the EL elements for modulating power from the power busses to the EL elements in response to a control signal; and a controller for providing control signals to the chiplets in response to an input image signal and for receiving displacement signals from the chiplets and producing touch signals.

20 Claims, 8 Drawing Sheets

FLEXIBLE MULTITOUCH ELECTROLUMINESCENT DISPLAY

CROSS REFERENCE TO RELATED APPLICATIONS

Reference is made to commonly-assigned, co-pending U.S. patent application Ser. No. 12/191,478, filed Aug. 14, 2008, entitled "OLED DEVICE WITH EMBEDDED CHIP DRIVING" to Dustin L. Winters, et al., the disclosure of which is incorporated herein.

FIELD OF THE INVENTION

The present invention provides a flexible EL display with an integrated, force activated multitouch touch screen that is responsive to an applied force.

BACKGROUND OF THE INVENTION

Traditional touch screen displays are formed by combining a display that is typically formed on a first substrate containing an array of thin film transistors with a touch screen that is formed on or in contact with a second substrate. Typically this second substrate is then positioned between the display substrate and the user.

This construction creates a number of problems that should be overcome. First, because the display and the touchscreen are created from separate materials and assembled together, displays with integrated touch screens can be relatively expensive. To decrease this cost, the touch screen is often formed using low cost electronics, which decreases the sensitivity, response time, or selectivity of the touch screen. One of the most common approaches is to apply a passive matrix addressing approach in which rows of sensors within the touch screen are addressed at any one time or an approach in which signals are read only from rows and columns of electrodes, without exact two-dimensional isolation. For example, Wong et al. in US Publication No. 2008/0158171, entitled "Digitizer for flexible display" discusses a flexible display layer using passive addressing as depicted in FIG. 6 of that publication. The use of active addressing techniques, using, for example, arrays of thin film transistors (TFTs) and capacitors to permit a signal to be accumulated and read out upon demand is more desirable as it can provide better user responsiveness and sensitivity but can be very expensive.

Another issue is that the touch screen is often not fully transparent, often including reflective metal traces or other non-transparent elements to permit electrical signals to be captured and conveyed to a processor external to the touch screen. Because this touch screen is often placed over top of the display and is not transparent, it typically reduces the contrast and therefore, the perceived quality of images presented on the underlying display. Further, the touch screen is often not in optical contact with the display and therefore, light emitted by the display can be reflected between the two substrates, further reducing the effective contrast of the display. As an example, Cheng in US Publication No. 2008/0180399, entitled "Flexible multi-touch screen" discusses a flexible display having a "transparent panel that is positioned in front of the flexible display device". However, in discussing the "transparent panel" in detail this embodiment indicates that the gap between sensors is preferably made small to increase the sensing area and to reduce optical differences between the space and the transparent sensors. Therefore, even in this touch screen, which is called "transparent," Cheng acknowledges that the sensors have optical properties that vary from the optical properties from other regions within the overlay and are thus not fully transparent.

Another issue is that because the touch screens do not always have the ability to discretely sample data from two-dimensional locations, it is often difficult to determine where the display is being touched when the user touches the display in more than one location. For example, Roberts in U.S. Pat. No. 7,196,694, entitled "Force sensors and touch panels using the same" and Laitinen et al. in US Publication No. 2007/0103449, entitled "Cost efficient element for combined piezo sensor and actuator in robust and small touch screen realization and method for operation thereof" discuss touch sensitive screens in which piezo actuators for measuring stress or strain are placed at the corners or edges of a substrate. However, because there are only four sensors and a relatively rigid surface is constrained only at the location of the sensors, it is practically impossible to distinguish a force applied by two fingers at two distinct locations from a single force applied midway between the two distinct locations using a touch panel of this type.

An additional problem with these touch screens is the parallax that is induced due to the fact that the touch sensor has a finite thickness and is arranged in front of the image plane. For this reason, the user's perceived touch location can be affected by his or her head position with respect to the center of the display. This further complicates usage of the display.

It is also known to use other user input or interaction besides touch to improve the interaction between the user and a display. In one example, it is known to incorporate bend sensors, for example, sensors for measuring strain in a substrate, to determine the degree to which a flexible display is bent and to enable the display to be updated as the display is bent. For example, Narayanaswami et al in US Publication No. 2006/0238494, entitled "Flexible displays as an input device" discuss incorporating bend sensors into a flexible substrate to permit the display to determine the degree to which a user bends the display. This publication teaches that the output from the bend sensors can be combined with other sensor values, such as those obtained from a touch sensor, to provide a rich user interaction. Such an interaction paradigm is interesting but does not provide for the direct manipulation of objects that is provided by a touch screen.

There is a need for a flexible display with a touch screen that does not overlay the image that is created to avoid degrading the perceived quality of the image, is useful with a flexible display, does not exhibit parallax, has improved sensitivity and enables multi-touch interfaces. There is also a continuing need for a flexible display which provides information in addition to touch location, such as the force or the rate at which the user presses the display.

SUMMARY OF THE INVENTION

In accordance with the present invention, there is provided a display device comprising:
 a) a touch sensitive EL display having:
 i) a flexible substrate;
 ii) one or more power busses disposed over the flexible substrate;
 iii) one or more EL elements disposed over the flexible substrate for emitting light in response to an electrical signal; and
 iv) a first plurality of distributed chiplets, each having a separate chiplet substrate, arranged so that at least two chiplets are associated with each of a plurality of touch sensitive areas on the EL display and for sensing stress or strain associated with bending of the flexible substrate or the chiplet substrate to provide respective displacement signals corresponding to the corresponding touch sensitive areas wherein each chiplet is connected to one or more of the power busses and one or more of the EL elements for modulating power from the power busses in response to a corresponding control signal to provide an electrical signal to the one or more EL elements; and     b) a controller for providing control signals to the chiplets in response to an input image signal and for receiving displacement signals from the chiplets and producing touch signals indicating the corresponding touch sensitive areas of the touch sensitive EL display that have been touched.

The present invention provides a force activated multi-touch sensor integrated on a single flexible display substrate with an electro-luminescent display device. This combination provides an extremely thin and flexible display device which supports direct user input without image quality degradation or parallax between the imaging and touch planes. The stress or strain gauges which provide the touch sensors are integrated in or with chiplets that have a primary function of driving the display. Therefore, incorporation of these stress or strain gauges requires little incremental cost over a comparable display without these sensors. The chiplets in some arrangements will have a relatively high density and therefore, the touch screen can provide the ability to detect multiple touches with high accuracy and differentiate stress or strain induced from localized forces occurring as a result of a finger or stylus touch from stress or strain induced by bending the display. Finally, the present invention provides a compensation mechanism for correcting the signal from the stress or strain gauges in response to heat that is created by the EL devices within the display device to improve the touch signals.

DETAILED DESCRIPTION OF THE INVENTION

The present invention provides for an EL display on a flexible substrate with an integrated array of strain or stress sensors and a controller for displaying images on the display and receiving displacement signals to provide touch signals.

Figure 1:
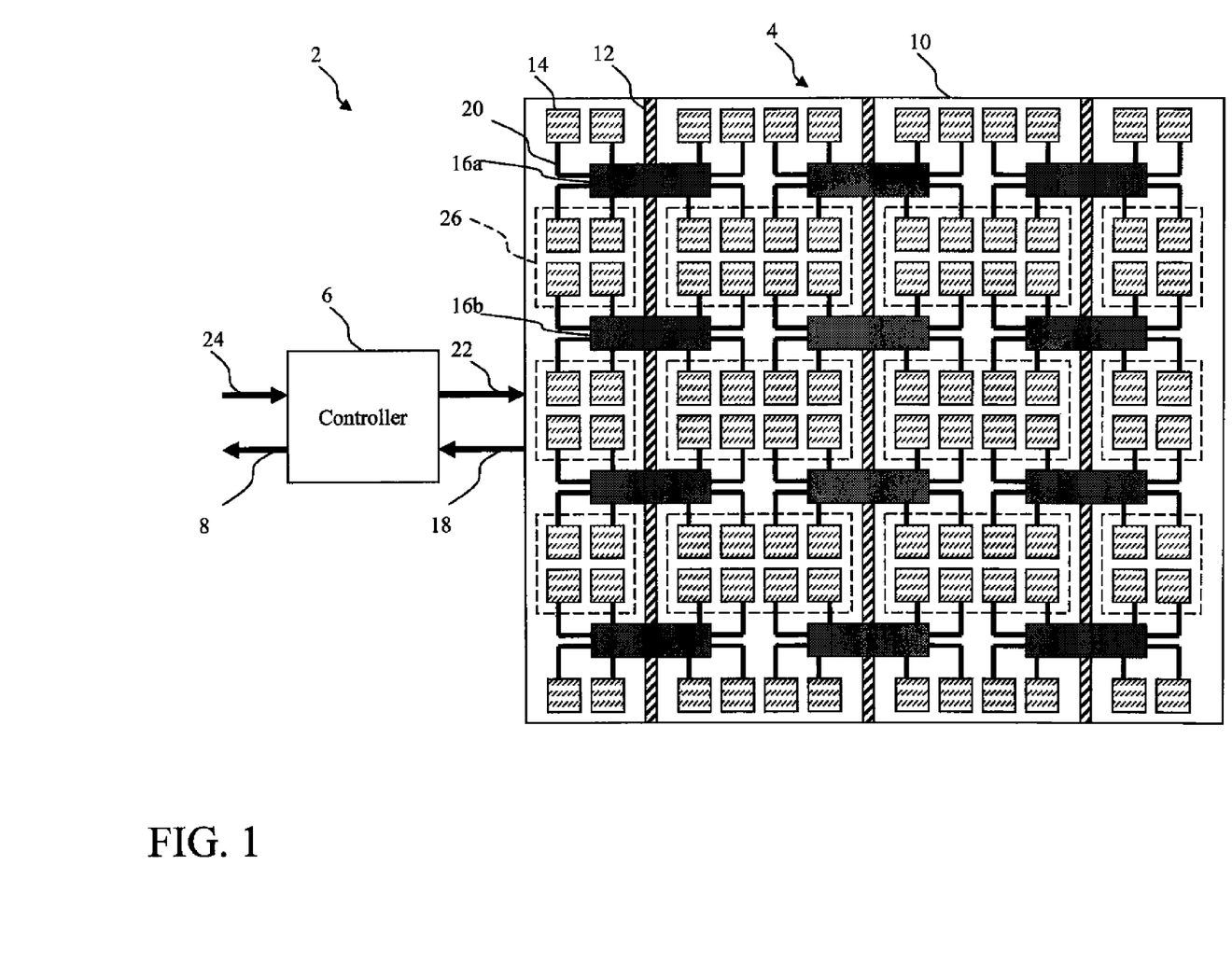
FIG. 1 is a schematic of a display device according to an embodiment of the present invention.

The present invention provides a display device 2 as shown in FIG. 1. This display device 2 is capable of producing touch signals 8 indicating the corresponding touch sensitive areas of the touch sensitive EL display 4 that have been touched. This flexible display device 2 includes a touch sensitive EL display 4 and a controller 6, wherein touch sensors are embedded within the EL display 4 such that touch overlays, corresponding electronics, or additional system components are not required. In some embodiments, this display is provided with a flexible support surface for constraining the deformation of the display 4.

Figure 2:
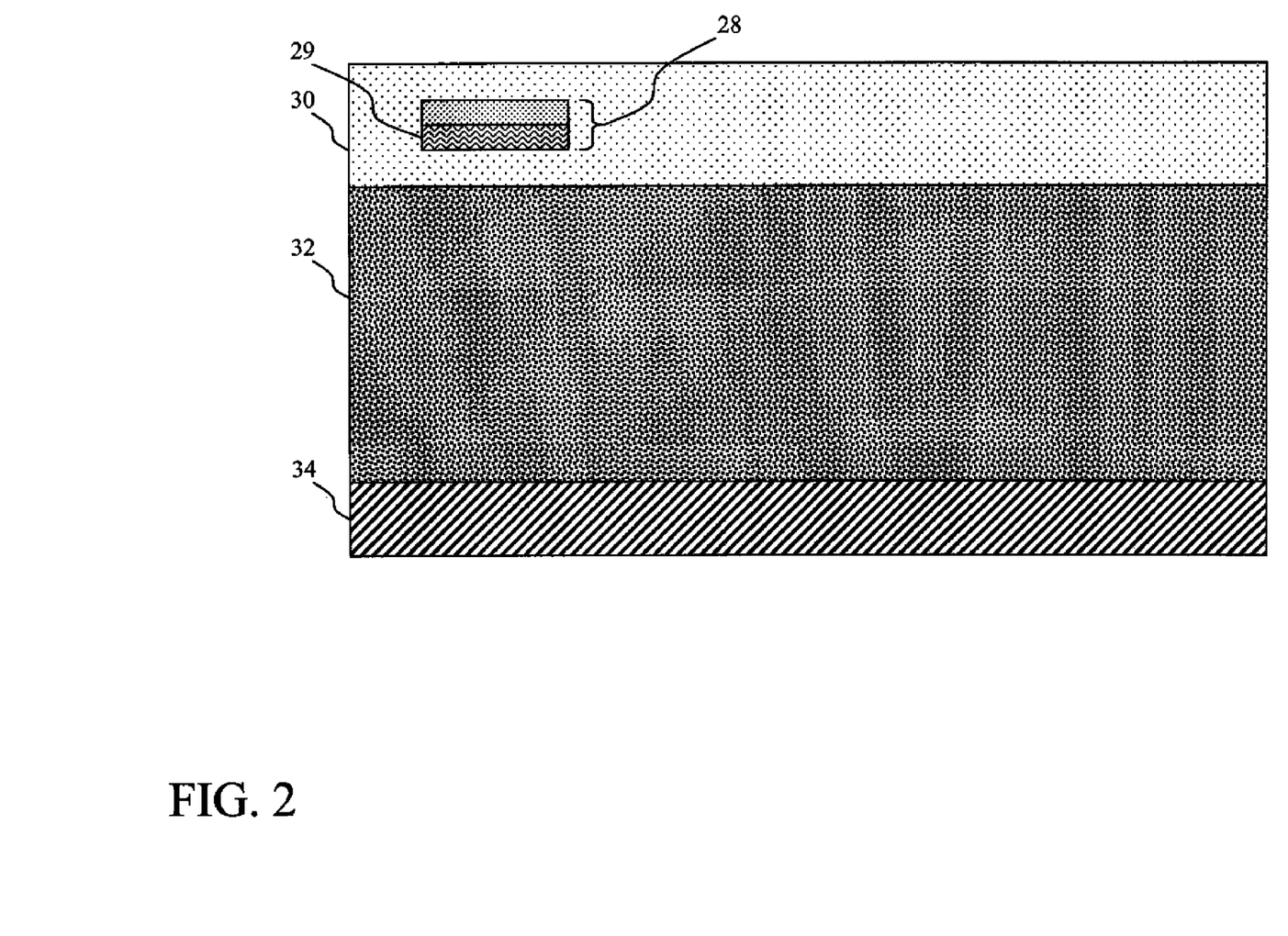
FIG. 2 is a cross-sectional view of a touch sensitive EL display and a partial cross-sectional view of a chiplet according to an embodiment of the present invention.

Within the present invention, the flexible display device 2 includes a touch sensitive electro-luminescent (EL) display 4 and a controller 6. The touch sensitive, EL display 4 is formed from a flexible substrate 10. One or more power busses 12 are formed and disposed over the flexible substrate 10. Additionally, one or more EL elements 14 are disposed over the flexible substrate 10 for emitting light in response to an electrical signal. Finally, a first plurality of distributed chiplets 16a, 16b are located on the flexible substrate 10. Each chiplet 16a, 16b has a separate chiplet substrate 29 (as shown in FIG. 2) and is arranged so that at least two chiplets 16a, 16b are associated with each of a plurality of touch sensitive areas 26 on the EL display 4 and sense stress or strain associated with bending of the flexible substrate 10 or the chiplet substrate 29 to provide respective displacement signals 18 corresponding to the corresponding touch sensitive areas 26. As the chiplet is attached to the flexible substrate, a stress or strain that is imparted to the touch sensitive EL display 4 will be transferred between the flexible substrate 10 and the chiplet substrate 29 such that stress or strain gauges formed on either the flexible or chiplet substrate will typically provide correlated values. In this touch sensitive EL display 4, each chiplet 16a, 16b is connected to one or more of the power busses 12 and one or more of the EL elements 14 for modulating power from the power busses in response to a corresponding control signal to provide an electrical signal to the one or more EL elements 14. For example, connector 20 forms an electrical connection between chiplet 16a and the EL element 14.

The controller 6 of the display device 2 provides control signals 22 to the chiplets 16a, 16b in response to an input image signal 24 and receives displacement signals 18 from the chiplets 16a, 16b. The controller uses these displacement signals 18 to produce touch signals 8 indicating the corresponding touch sensitive areas 26 of the touch sensitive EL display 4 that have been touched.

In the arrangement provided by the present invention, the chiplets 16a, 16b, which provide touch sensing signals, are formed on the flexible substrate 10 of the touch sensitive EL display 4 and, therefore, do not overlay the image that is presented on the touch sensitive EL display. Therefore, the image quality of the display device 2 of the present invention is not degraded by the presence of touch sensors and will, typically, exhibit no appreciable parallax since the sensors are formed within hundreds of angstroms of the plane of light-emission within the EL elements 14. Because the stress or strain gauges are constructed in or in contact with chiplets 16a, 16b, that are used to drive the EL elements 14 of the touch sensitive EL display 4, the additional cost of adding this technology is minimal, enabling active control of multiple, often hundreds or thousands of sensors per display. Therefore, signals can be employed from multiple chiplets 16a, 16b to determine touch location (i.e., touch sensitive area 26), providing improved sensitivity and enabling the decoding of multiple simultaneous touches. This high density array of sensors, which can be addressed rapidly, permits typical bending of the flexible substrate 10 to be isolated from discrete touches, enabling stress or strain gauges to be applied to provide a touch interface using stress or strain gauges embedded in the flexible substrate 10. This function is further improved through the use of the optional flexible support surface for constraining the deformation of the flexible substrate 10 such that bending of the touch sensitive EL display 4 results in slow changes in stress or strain as a function of distance and touches result in more localized changes in stress or strain within the flexible substrate 10. The presence of stress or strain sensors, which will, in some arrangements, provide a continuous signal as a function of changes in stress or strain, provides information in addition to touch location, including the force or the rate at which the user presses on the touch sensitive EL display 4.

Light emission from the touch sensitive EL displays 4 of the present invention are typically formed from an electro-luminescent layer coated between a pair of electrodes. These devices include electro-luminescent layers employing purely organic small molecule or polymeric materials, typically including organic hole transport, organic light-emitting and organic electron transport layers as described in the prior art, including U.S. Pat. No. 4,769,292, issued Sep. 6, 1988 to Tang et al., and U.S. Pat. No. 5,061,569, issued Oct. 29, 1991 to VanSlyke et al. Alternate electro-luminescent layer includes organic and inorganic materials, typically including organic hole transport and electron transport layers in combination with inorganic light-emitting layers, such as the light-emitting layers described in U.S. Pat. No. 6,861,155 issued Mar. 1, 2005 to Bawendi et al. In other alternate arrangements, the electro-luminescent layer is formed from fully inorganic materials such as the devices described in co-pending US Patent Publication 2007/0057263 filed Sep. 14, 2005, entitled "Quantum Dot Light Emitting Layer". Touch sensitive EL displays 4 of the present invention can emit light through the flexible substrate 10 or through the side opposite the flexible substrate.

To provide flexibility, the touch sensitive EL display 4 will be formed on a flexible substrate 10. This flexible substrate 10 will often be formed from a thin sheet of metal or polymeric material. Thin metal substrates include substrates formed from stainless steel, which is coated with a polymer layer to smooth or insulate the surface of the stainless steel on which the device is formed. Alternatively, the flexible substrate 10 is formed on a flexible sheet of plastic, typically coated with materials for preventing the ingress of moisture through the flexible substrate 10. To be useful in the present invention, the flexible substrate 10 will typically be deformable by a force of 100 grams or less and be capable of flexing along at least one dimension to wrap around a surface of a cylinder having a 2 inch diameter.

A chiplet 16a, 16b is a separately fabricated integrated circuit, which is mounted and embedded into the touch sensitive flexible EL display 4. Much like a conventional microchip (or chip) a chiplet 16a, 16b is fabricated with a chiplet substrate 29 (as shown in FIG. 2) and contains integrated transistors as well as insulator layers and conductor layers, which are deposited and then patterned using photolithographic methods in a semiconductor fabrication facility (or fab). These transistors in the chiplet 16a, 16b are arranged in a transistor drive circuit to modulate electrical current to EL elements 14 of the touch sensitive EL display 4. A chiplet 16a, 16b is smaller than a traditional microchip and unlike traditional microchips, electrical connections are not made to a chiplet 16a, 16b by wire bonding or flip-chip bonding. Instead, after mounting each chiplet 16a, 16b onto the flexible substrate 10, deposition and photolithographic patterning of conductive layers and insulator layers are used to form the necessary attachments. Therefore, the connections are typically made small, for example through using vias 2 to 15 micrometers is size.

Because the chiplets 16a, 16b are fabricated in a traditional silicon fabrication facility, the semi-conductor within these chiplets 16a, 16b are extremely stable, robust and has excellent electron mobility. As such, transistors for modulating the current from a power buss 12 to the EL elements 14 are often very small. Further, reference transistors are formed in the chiplet in some arrangements, which will pass a very consistent amount of current. However, because the mobility of the semi-conductor does vary somewhat with temperature, the flow of current through these reference transistors will typically be directly correlated with temperature and therefore these reference transistors are used to provide a measurement of the temperature of each chiplet 16a, 16b within a localized region of the flexible EL display 4. In some embodiments, CMOS sensors are also formed within these chiplets for detecting changes in light at each of these chiplets, providing an optical sensor within each chiplet 16a, 16b. Further in some arrangements, instruments for measuring stress or strain are constructed within these chiplets. For example, in some arrangements piezoelectric sensors are fabricated within the chiplets. Thus the flow of current from these piezoelectric sensors will typically be correlated with the stress or strain that is placed on the chiplet.

The current invention will typically employ touch sensors, which measure stress or strain within the flexible substrate 10. These touch sensors will typically include either piezoelectric sensors which are constructed inside the chiplets and react to forces which are placed on the crystal lattice of the chiplet to produce a measurable current that is correlated with the stress placed on a chiplet or they include a strain gauge 52a, 52b that is formed from a pattern of thin conductor (often metal) within the display structure and which is connected to one of the chiplets. This type of strain gauge will be provided with an electrical signal and current through the strain gauge will indicate the amount of strain to which the flexible substrate 42 is exposed. More detailed embodiments are provided further in this disclosure. The present invention requires the presence of multiple chiplets for providing displacement signals and therefore, it is only required that the display have multiple touch sensors. However, it is useful within the present embodiment, to provide a relatively high density of touch sensors. A touch sensitive EL display 4 of the present invention, will typically include a at least one touch sensor for every 5 cm$^2$ of display area and each touch sensitive EL display 4 will typically include at least 20 touch sensors. In more desirable embodiments, touch sensitive EL displays 4 of the present invention will typically include more than 100 touch sensors.

It should be noted, however, that either the piezoelectric devices or the traditional strain gauges provide a signal that is dependent upon the temperature of their immediate environment. Although the EL elements 14 of the present invention should, ideally, convert electricity to light, the efficiency of this conversion is often less than desired and therefore, a significant portion of the power provided to the EL elements 14 will typically be converted to heat. Further, resistance within the power busses 12 and other electrical components within the display will typically result in unwanted energy losses in the form of heat. Therefore, the temperature of the flexible substrate 10 and the piezoelectric devices or strain gauges are directly influenced by the current that is provided to the EL elements 14 within the vicinity of these sensors as a portion of this current is converted to heat. This heat directly influences the measured current through the touch sensors, which should ideally correlate only with stress or strain. Therefore, in some embodiments of the present invention, it is necessary to correct the readout or current from the stress or strain gauges in response to a measured or predicted temperature.

Within the present invention, the term, "Touch Sensitive Area" is employed. This term relates to any area of the touch sensitive flexible EL display 4 for which a touch location is determined. Within some arrangements of the display device 2 of the present invention, individual strain or stress gauges are densely packed and therefore touching the touch sensitive flexible EL display 4 with an object as large as a finger, which deflects the flexible substrate 10, will cause a measurable stress or strain signal to be provided by multiple sensors each located at a unique location on the flexible substrate 10. As such, displacement signals 18 indicating the stress or strain of the flexible substrate or one or more chiplet substrate(s) will be provided to the controller 6 by multiple sensors. The controller 6 will typically use these multiple displacement signals 18 and in some arrangements their force components to determine a touch location. This touch location will be provided with a high degree of accuracy within any touch sensitive area, according to some embodiments of the present invention. It should be noted that FIG. 1 depicts the touch sensitive area 26 as the area between two chiplets 16a, 16b, but through the use of mathematical techniques such as interpolation or triangulation the smallest touch sensitive area differentiated by the controller 6 of the present invention will typically be much smaller than this area, permitting multiple touch sensitive areas 26 to be distinguished between any two chiplets 16a, 16b or touch sensors.

Some embodiments will also include an optional support surface. This optional support surface is useful to limit bending of the flexible substrate 10 that is not associated with touching of the touch sensitive EL display 4. In preferred embodiments, this optional support surface will typically permit localized deflection of the flexible substrate 10 when it is exposed to a force due to touch but provide a counterforce to the force that induces this deflection. A specific embodiment is depicted in FIG. 2. As shown in this figure, the touch sensitive EL display 30 contains chiplets 28, each of which is formed on a chiplet substrate 29. The touch sensitive EL display is mounted on an optional compressible support surface 32 such that light is emitted from the touch sensitive EL display 4 in the direction opposite the optional compressible support surface 32. This optional compressible support surface 32 is formed, for example, from a high density foam. This optional compressible support surface 32 will ideally be thicker than the touch sensitive EL display 6. In preferred embodiments, the optional compressible support surface 32 will typically have a thickness of between 1 and 10 mm such that the user can feel the deflection of the surface. The optional compressible support surface 32 will typically have a thickness of more than 2 mm and will preferably be thick enough to permit a deflection of at least 5 mm. In some embodiments, this optional compressible support surface 32 will be attached to a further optional additional support substrate 34. This optional additional support substrate 34 will ideally be formed from a bendable and rollable material that is not as susceptible to localized deflection as the touch sensitive EL display 30. As such, when the touch sensitive EL display 6 is mounted on the optional compressible support surface 32 and the optional additional support substrate 34, one can roll the entire apparatus for compact storage or lay the entire apparatus across an uneven surface, such as a lap to enable interaction while constraining the bending of the touch sensitive EL display 4 in response to forces other than touches. As such, the force required to cause an appreciable localized deflection of the additional support substrate 34 will typically be at least an order of magnitude more than is required to cause an equivalent localized deflection of the touch sensitive EL display or the optional compressible support surface 32. As such the touch sensitive EL display 4 can include a somewhat rigid support, such as a tabletop or the additional support substrate 34 adjacent to the flexible substrate 10.

Figure 3:
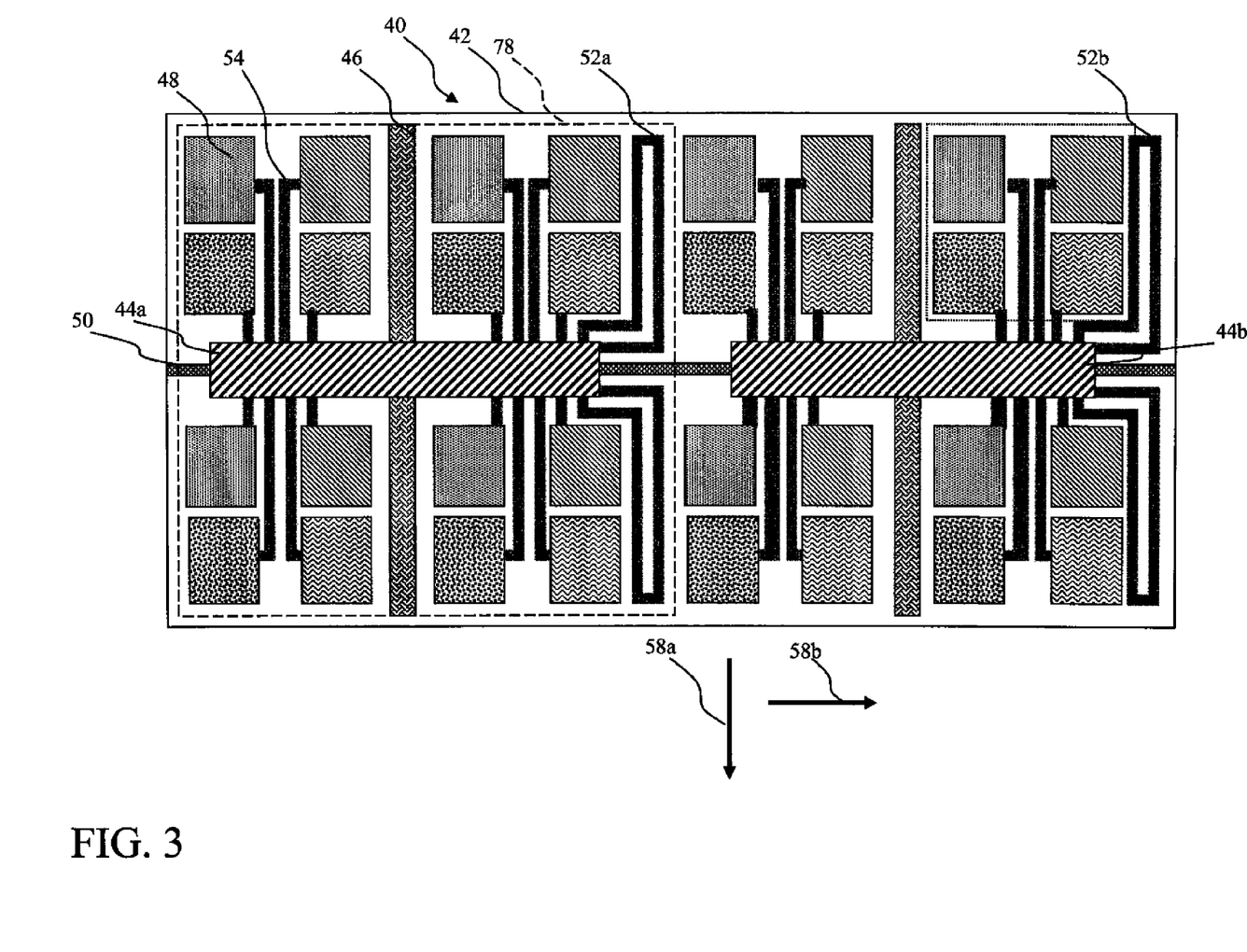
FIG. 3 is a schematic of a portion of a touch sensitive EL display according to an embodiment of the present invention.

A portion 40 of a touch sensitive EL display 4 useful in the display device 2 of the present invention is shown in FIG. 3. As shown in this figure, the touch sensitive EL display 4 includes a plurality of distributed chiplets 44a, 44b. These chiplets 44a, 44b are distributed over and attached to a surface of the flexible substrate 42. In one example, these chiplets 44a, 44b are attached to the flexible substrate 42 by an adhesive and then sealed to the flexible substrate 42 by providing a thick smoothing layer over top of the chiplets 44a, 44b. Vias are then formed through this smoothing layer to permit electrical contact to the chiplets. A metal layer is formed over this smoothing layer such that it makes electrical contact to the chiplets 44a, 44b through the vias and the metal patterned to form useful features, including power busses 46, electrical connectors 54 for the EL elements 48, and signal wires 50 for providing a data signal. In some embodiments, this same metal layer is patterned to provide strain gauges 52a, 52b, which are connected to the chiplets. As such, the display will include a single metal layer and the strain gauges and the power busses will both be formed from this single metal layer. In some arrangements this metal layer is used to form an electrode for the EL elements 48. Alternatively transparent conductors, such as thin layers of silver, ITO or other suitable materials are deposited over the metal layer and patterned to form a first electrode for an EL element 48. EL layers are then deposited, followed by a second electrode for forming the EL elements 48. The entire device can then be encapsulated by attaching a flexible cover sheet to the flexible substrate to form the flexible, touch sensitive EL display 4. In this embodiment, the portion 40 of the touch sensitive EL display 4 includes a plurality of distributed chiplets 44a, 44b for modulating power from the power busses 46 to provide an electrical signal to the one or more EL elements 48. This electrical signal is provided through the electrical connectors 54. The portion 40 of the touch sensitive EL display 4 further includes a plurality of strain gauges 52a, 52b formed on the flexible substrate 42 and wherein one or more of the strain gauges 52a, 52b are connected to each chiplet 44a, 44b, respectively, for measuring strain of the flexible substrate due to deflection.

Figure 4:
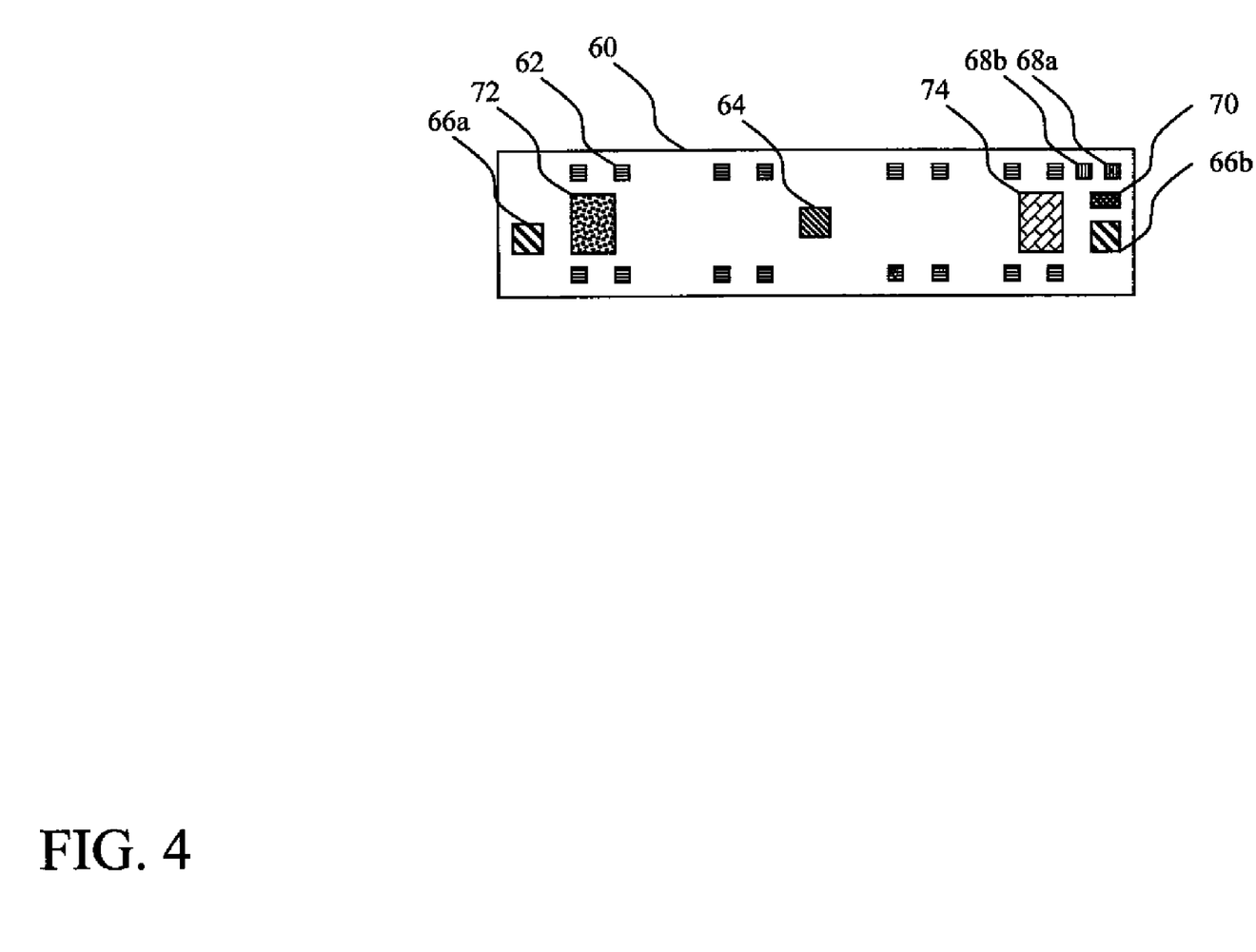
FIG. 4 is a schematic of a chiplet useful in an embodiment of the present invention.

FIG. 4 illustrates components of the chiplets 44a, 44b within one embodiment. As shown, the chiplet 60 in FIG. 4 provides contact points 62 for connecting the electrical connectors 54 in FIG. 3 to circuits that are embedded in the chiplet 60 for modulating power from the power buss 46 of FIG. 3 to the electrical connectors 54 in FIG. 3. These circuits respond to signals provided on the signal wires 50 in FIG. 3, which are connected to signal wire contact points 66a and 66b in FIG. 4 to modulate power from the power buss 46 of FIG. 3, which is connected to the power buss contact point 64 of the chiplet. Also shown in FIG. 4 are strain gauge contact points 68a, 68b for connecting both ends of the strain gauge 52a in FIG. 3 to the chiplet 60. These contact points permit a strain gauge circuit 70 to provide a known voltage through the strain gauge, measure the current that flows through the strain gauge and provide a signal indicating the current or the strain implied by the current to the controller 6 of FIG. 1. As shown in this embodiment, this signal is time multiplexed with the control signals 22 which are provided over the same signal wires 50 and can therefore be passed to the controller as displacement signals 18 over these shared signal wires 50.

The chiplet 60 of FIG. 4 further contains a piezoelectric component 72 for measuring the stress within the chiplet. This piezoelectric component can also contain circuitry for providing and measuring a current to produce and provide a displacement signal to the controller 6 of FIG. 1 through signal wires 50 of FIG. 3. Therefore, as shown, one or more of the chiplets include a piezoelectric component 72 for measuring stress of the chiplet substrate. It is not required that each chiplet 60 on the flexible substrate 42 contain a piezoelectric component 72, however, multiple chiplets 60 will typically be provided on the flexible substrate 42, each of which will include a piezoelectric component 72 for measuring stress of the chiplet substrate 29 to produce corresponding displacement signals 102 (shown in FIG. 5B).

Although the particular embodiment illustrated within FIGS. 3 and 4 includes both a traditional strain gauge, which is attached to the chiplet and a piezoelectric sensor within the chiplet for measuring stress, the redundancy of having both sensors for determining force placed upon the touch sensitive EL display is not required. In this particular embodiment, however, it should be noted that the long axis of the traditional strain gauge 52a, 52b is oriented along the direction indicated by arrow 58a in FIG. 3 and the long axis of the chiplet 44a containing the piezoelectric sensor 72 is oriented in a perpendicular direction indicated by arrow 58b. This particular arrangement is particularly useful in separating stresses or strains along these two dimensions in response to an applied force as the sensors are more sensitive to a deflection of the flexible or chiplet substrate along an axis perpendicular to the long axis of these structures than to deflection of the flexible or chiplet substrate in other directions.

Also shown in the chiplet 60 of FIG. 4 is a temperature sensor 74. This temperature sensor will typically include a TFT through which the flow of current will be measured within some embodiments. This current will typically increase with an increase in temperature and decrease with a decrease in temperature. This sensor will provide a temperature signal to the controller 4 of FIG. 1 through the signal wires 50 of FIG. 3 or use this current to adjust the signal values provided by the piezoelectric sensor 72 or the traditional strain gauge 52a, 52b of FIG. 3 before these signal values are provided to the controller 4 of FIG. 1 through the signal wires 50 of FIG. 3. Note that each chiplet 44a corresponds to a region 78 on the flexible substrate 42 as shown in FIG. 3. Therefore, the temperature signal provided by the temperature sensor 74 will typically provide a temperature of the chiplet 44a and approximate the temperature of the flexible substrate 42 within the region 78 around the chiplet 44a. As such, the flexible substrate 42 is divided into one or more regions 78, each region includes one or more of the plurality of chiplets 44a, and at least one chiplet 44a in each region 78 includes a temperature sensor 74 for determining the temperature of the flexible or chiplet substrate and providing a temperature signal to provide the touch signals 8 that are corrected for variations in temperature. In some arrangements, this temperature signal is provided to the controller 6 wherein the controller 6 employs the temperature signals to provide the touch signals 8 that are corrected for variations in temperature as will be discussed shortly. Alternately, the chiplet 44a can adjust signals from the piezoelectric components 72 or the traditional strain gauges 70 to adjust the displacement signals 18 to provide the touch signals 8 that are corrected for variations in temperature that occur as power is provided to the EL elements 14. In one arrangement, this correction can is accomplished by subtracting a threshold current from the current provided by the temperature sensor 74, inverting the result and then subtracting the result or a correlate of the result from the currents provided by the piezoelectric components 72 or the traditional strain gauges 52a, 52b. As such, the at least one chiplet 60 in each region 78 determines a temperature signal corresponding to the determined temperature of the chiplet 44a and adjusts the displacement signals 18, which, in some embodiments are embedded in the signals provided on the signal wire 50 and correspond to the touch sensitive regions 78 before the displacement signals 18 are provided to the controller 6 which provides touch signals 8 that are corrected for variations in temperature.

Although temperature sensors 74 are provided within the chiplets 60 to directly measure a correlate with temperature to permit the display to adjust the displacement signals 18 corresponding to the corresponding touch sensitive regions to permit the touch signals to be corrected for variations in temperature, it is not necessary for such sensors to be provided to directly measure such a correlated value in order to correct the touch signals for variations in temperature. In other embodiments, this temperature is estimated by determining an estimate of the current provided to regions of the touch sensitive EL display 40 and applying this estimate to indirectly estimate the temperature or change in temperature of the regions within the touch sensitive EL display.

Figure 5A:
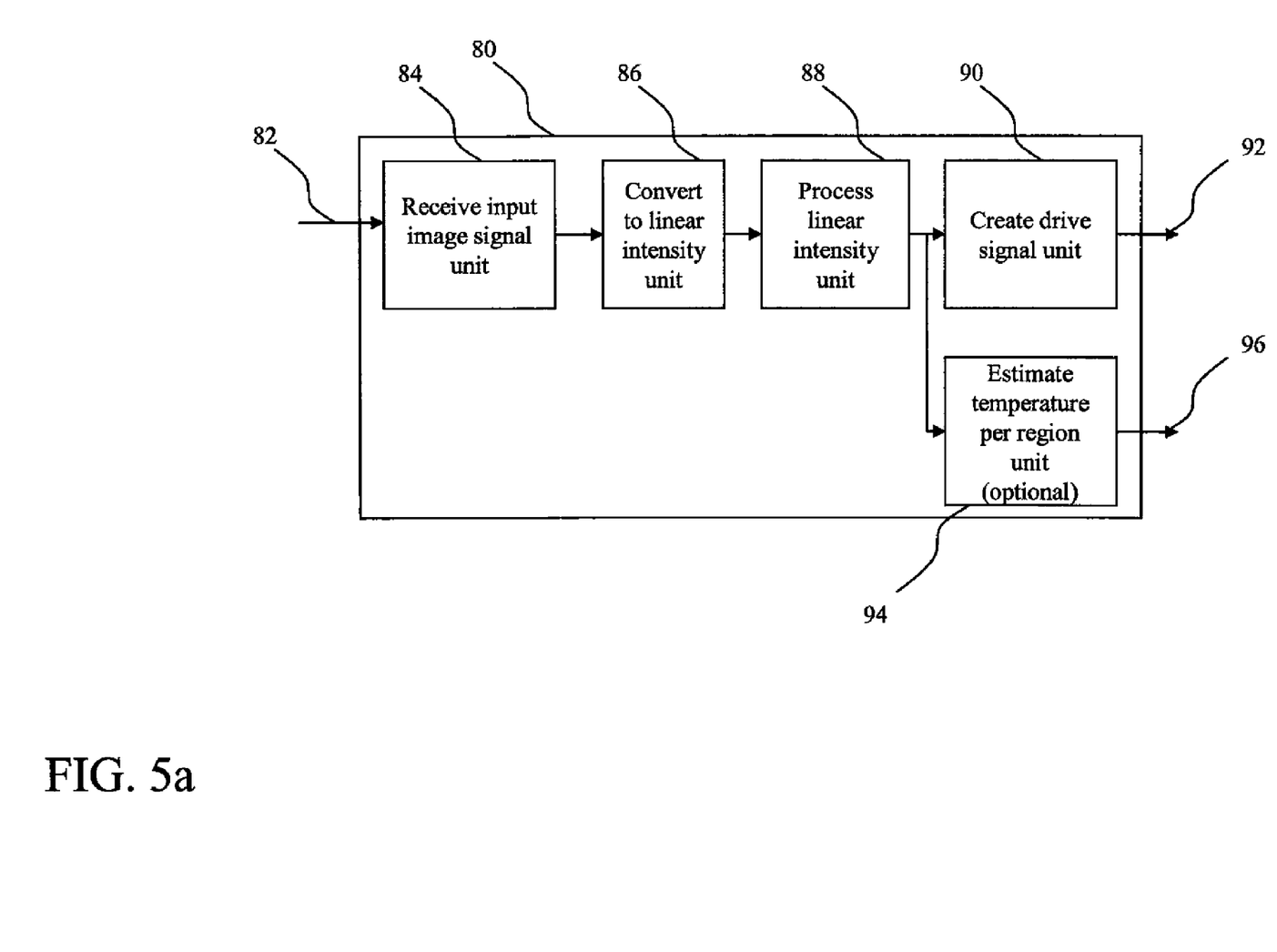
FIG. 5a is a schematic of a portion of a controller useful in an embodiment of the present invention.

FIG. 5a provides a portion of a controller, which estimates the temperature in multiple regions 78 of the flexible substrate 42 shown in FIG. 3. In one embodiment, the controller 80 includes a unit 84 for receiving an input image signal 82 and provides this signal to the convert to linear intensity unit 86. This unit converts the values in the input image signal 82 to linear intensity values, which are typically correlated with current. These values are provided to the process linear intensity unit 88. In some embodiments, the process linear intensity unit 88 sums the linear intensity values which have implied coordinates corresponding to multiple regions within the flexible substrate such that a different sum is provided for each of the multiple regions 78. Specifically, the input image signal typically includes a series of values provided in a time sequential fashion to indicate the desired luminance for each EL element within the input image signal 82 and the coordinates of each EL element on the display device of each value in the input image signal 82 is implied by the timing of each signal with respect to a reference signal, such as a line retrace signal. By applying these implied coordinates, the values are summed for all EL elements within each region 78. In some embodiments, the sums are provided to the optional estimate temperature per region unit 94, which calculates an estimate of the temperature of the flexible or chiplet substrate within each of the multiple regions 78 of the flexible substrate 42. However, in some arrangements the sums are applied directly as an estimate of the flexible or chiplet substrate temperature within each corresponding region 78. The estimated temperature values for each of the plurality of regions 78 are then output as a temperature signal 96 which are applied by other units to correct stress or strain signals to correct for the variation of this signal due to changes in temperature. As will be discussed further, this correction includes scaling the displacement signals by the inverse of the temperature estimate to provide touch signals that are corrected for variations in temperature. The portion 80 of the controller shown in FIG. 5a can also include a create drive signal unit 90, which will typically receive linear intensity values and process these values to provide a drive signal 92, which will be provided to the chiplets 16a, 16b to control the light output of the EL elements 14. As described in this embodiment, the flexible substrate 42 is divided into one or more regions 78, each region 78 includes one or more of the plurality of chiplets 44*a*, and the controller, a portion 80 of which is depicted in FIG. 5*a*, further includes estimating apparatus responsive to the input image signal for estimating a temperature of the flexible or chiplet substrate(s) in each region and providing a corresponding temperature signal 96, wherein the controller employs the temperature signals 96 to provide the touch signals that are corrected for variations in temperature.

Figure 5B:
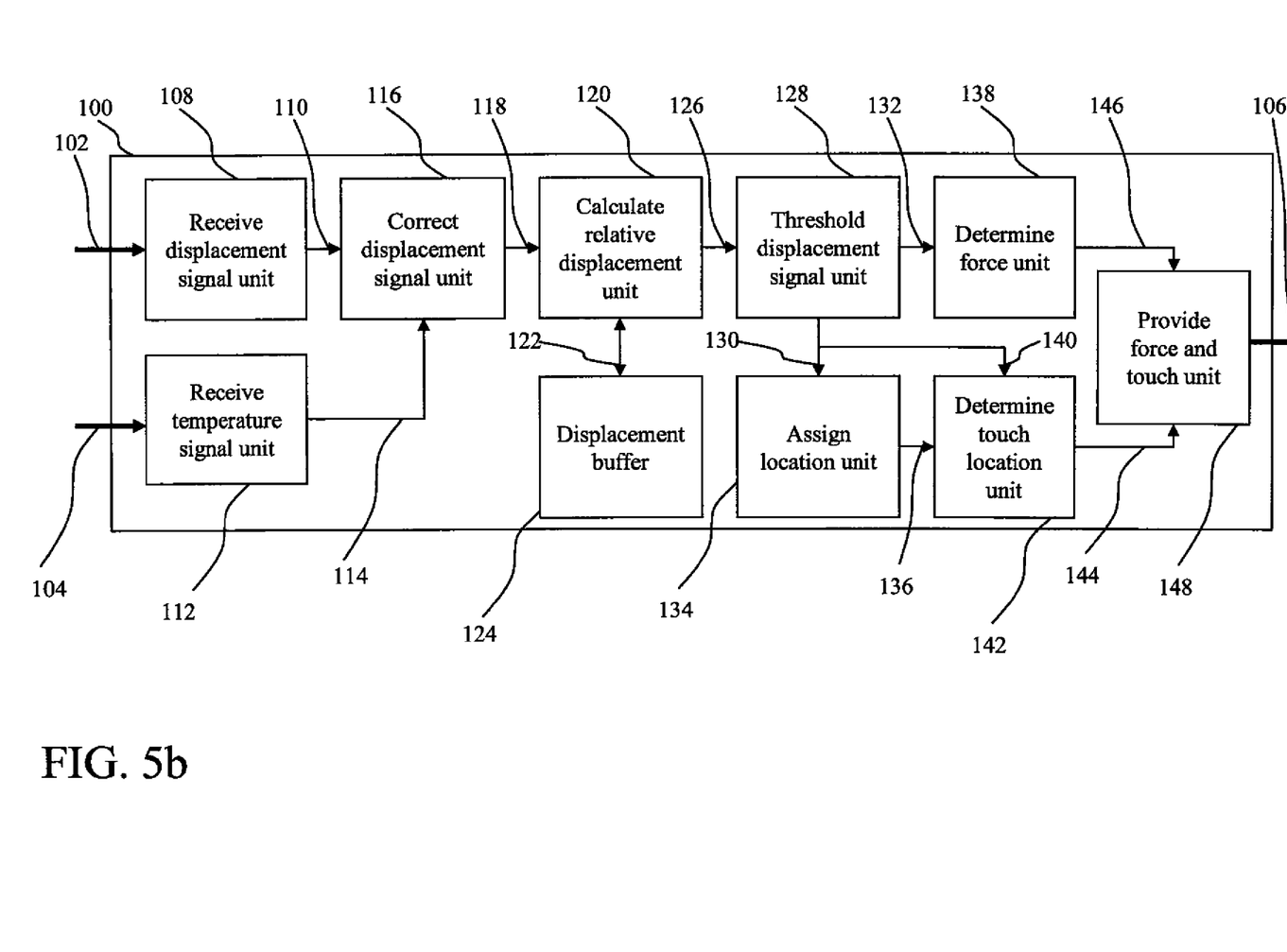
FIG. 5b is a schematic of a portion of a controller useful in an embodiment of the present invention.

FIG. 5*b* depicts a second controller portion 100 for receiving a displacement signal 102 and a temperature signal 104, such as the temperature signal 96 provided by the first controller portion 80, and outputting a touch signal 106. This temperature signal 104 can, however come from other sources, including the temperature sensor 74 within the chiplet 60 shown in FIG. 4. In a typical arrangement, the chiplet 60 on the flexible substrate 42 provides displacement signals 102 to the second controller portion 100. These displacement signals 102 indicate the amount of stress or strain imposed on the embedded touch sensors (i.e., the strain gauge 52*a*, 52*b* or piezoelectric component 72) by a touch or other force. The second controller portion 100 then converts these signals to touch signals 106. The touch signals 106 will typically include one or more touch locations, and will typically be provided to a high level controller, which will employ these signals to respond to the user's actions. However, in some embodiments, the touch signal 106 will include a location component and a force component. The force component can then further be employed to respond to the user. In some embodiments, the controller provides touch signals only when the force component of the displacement signal is above a selected level or when this force component changes by a selected amount within a specified time interval.

Referring to FIG. 5*b*, a second controller portion 100 will include a receive displacement signal unit 108 for receiving the displacement signal 102 and a receive temperature unit signal unit 112. These units will decode the displacement signal 102 and temperature signal 104 to provide displacement signal values 110 and temperature signal values 114, which are time synchronized such that the displacement signal values 110 and the temperature signal 114 values are provided in a way that they pertain to the same regions 78 on the flexible substrate 42 in FIG. 3. These values 110, 114 are provided to the correct displacement signal unit 116, which adjusts the displacement signal values 110 as a function of the temperature signal values 114. Specifically, the correct displacement signal unit will typically provide an adjustment such that the displacement signal values 110 will be adjusted as a function of the inverse of the temperature signal values 114 since both the strain gauges 52*a* and piezoelectric components 72 will typically provide a higher signal value as the temperature of the flexible or chiplet substrate is increased by the increase in current that is provided to the EL elements 14 within the touch sensitive EL display 4. This correct displacement signal unit 116, therefore adjusts the displacement signal values 110 to compensate for the sensitivity of the strain gauges 52*a* and piezoelectric components 72 to changes in temperature to provide corrected displacement signal values 118.

The corrected displacement signal values 118 are then provided to the calculate relative displacement unit 120. Because the flexible substrate 42 is flexible, it will likely not be flat at all times and therefore, there will be strain or stress indicated by at least a subset of the strain gauges or piezoelectric components even when the touch sensitive EL display is not touched. Therefore, second controller portion 100 and more specifically the calculate relative displacement unit 120 can prevent a response to a static strain or stress but instead can adjust the signal based upon historic values. To accomplish this, the calculate relative displacement unit 120 can retrieve a reference displacement signal 122 from a displacement buffer 124. The displacement buffer 124 is a memory, which stores reference displacement signals 122 for each region. The calculate relative displacement unit then calculates absolute displacement signal 126 value by subtracting the reference displacement signal 122 from the corrected displacement signal values 118, optionally truncating any values less than zero to zero. This calculate relative displacement unit 120 enables the corrected displacement signal values to be corrected for static stress or strain values that are induced by applying a constant bend to the display. In some embodiments, this unit 120 can provide additional spatial filtering to differentiate localized and large area changes in the corrected displacement signal values 118 within the displacement signals. Since bending of the flexible substrate 10 will typically result in low spatial frequency changes in stress or stain and touches will typically result in higher spatial frequency changes in stress or strain, this unit can differentiate these types of deformation. That is, the calculate relative displacement unit can apply a high pass or band pass spatial filter to the corrected displacement signal values 118 and provide the result to the threshold displacement signal unit 126 to identify touch locations. This high pass or band pass filter will often have a spatial extent that is on the order of about 1 to 2 cm and typically between 0.2 and 2.5 cm.

The absolute displacement signal 126 is then output to the next unit 128. The calculate relative displacement unit 120 can also calculated a revised reference displacement signal 122 and store it into the displacement buffer 124 for later use. For example, the calculate relative displacement unit 120 can calculate an exponential moving average of the previous relative displacement signal value and the absolute displacement signal 126 and store this value as the revised reference displacement signal 122 in the displacement buffer 124. The threshold displacement signal unit 128 can then threshold the absolute displacement signal 126, producing a flag signal 140, indicating any regions having an absolute displacement signal greater than a predetermined threshold. The assign location unit 134 also receives a timing signal 130 from the threshold displacement signal unit 128 that is synchronized with the absolute displacement signal 126 and assigns location coordinates to form a coordinate signal 136. The determine touch location unit 142 applies the flag signal 140 to select location coordinates from the coordinate signal 136 that correspond to displacement signal values that are greater than the threshold. These coordinates then form the location signal 144. Simultaneously, the threshold displacement signal unit 128 outputs a displacement signal 132 to the determine force unit 138 when these values are greater than the threshold. This unit 138 converts the displacement signal into force units using a standard conversion method and outputs a force signal 146. The provide force and touch unit 146 then receives a force signal and a set of coordinates for each region having a displacement signal above threshold. From these signals, the provide force and touch unit 146 clusters the locations into potential touch points, based upon continuity of the coordinates and the force signal 146. This unit 148 might use techniques such as cluster analysis to determine clusters of coordinates or might apply trend analysis to determine values that are near minima or maxima in the force signal 146 to determine likely centroids of touch locations. This is important since a single finger placed on the touch sensitive EL display might produce displacement signals that are above threshold for several regions. However, if these regions will often be localized around the location of the finger touch and the highest displacement signal value is likely to occur at the point where the finger has the most contact with the touch sensitive EL display. However, it is not necessary that the user touch the display with a single finger and can touch the touch sensitive EL display 4 with multiple fingers. Each of these finger touches will typically result in displacement signals that are above threshold if the touch is hard enough and the center of each finger touch is independently isolated, thus permitting the touch sensitive EL display 4 to provide information regarding multiple simultaneous touches and therefore forming a flexible multitouch EL display. Besides applying cluster analysis or trend analysis, other techniques are applicable, including pattern matching techniques in which patterns corresponding to typical patterns of displacement signals that occur when the touch sensitive EL display is touched with individual fingers, side by side fingers, and various hand positions are matched to distributions of force or coordinates to determine the type of object touching the display. From this analysis, the provide force and touch unit outputs a touch signal. This touch signal 106 will typically include a single pair of coordinates corresponding to each object that touches the display and it can include a force value indicating the force with which each object is touching the display. Further, the touch signal 106 can output likely hand parts that are in contact with the display, permitting the location of the heals or palms of the hand as different types of touches than touches provided by fingers or thumbs. As described, the controller, which includes the second controller portion 100 simultaneously detects multiple touches on different touch sensitive areas within the touch sensitive EL display.

Figure 6:
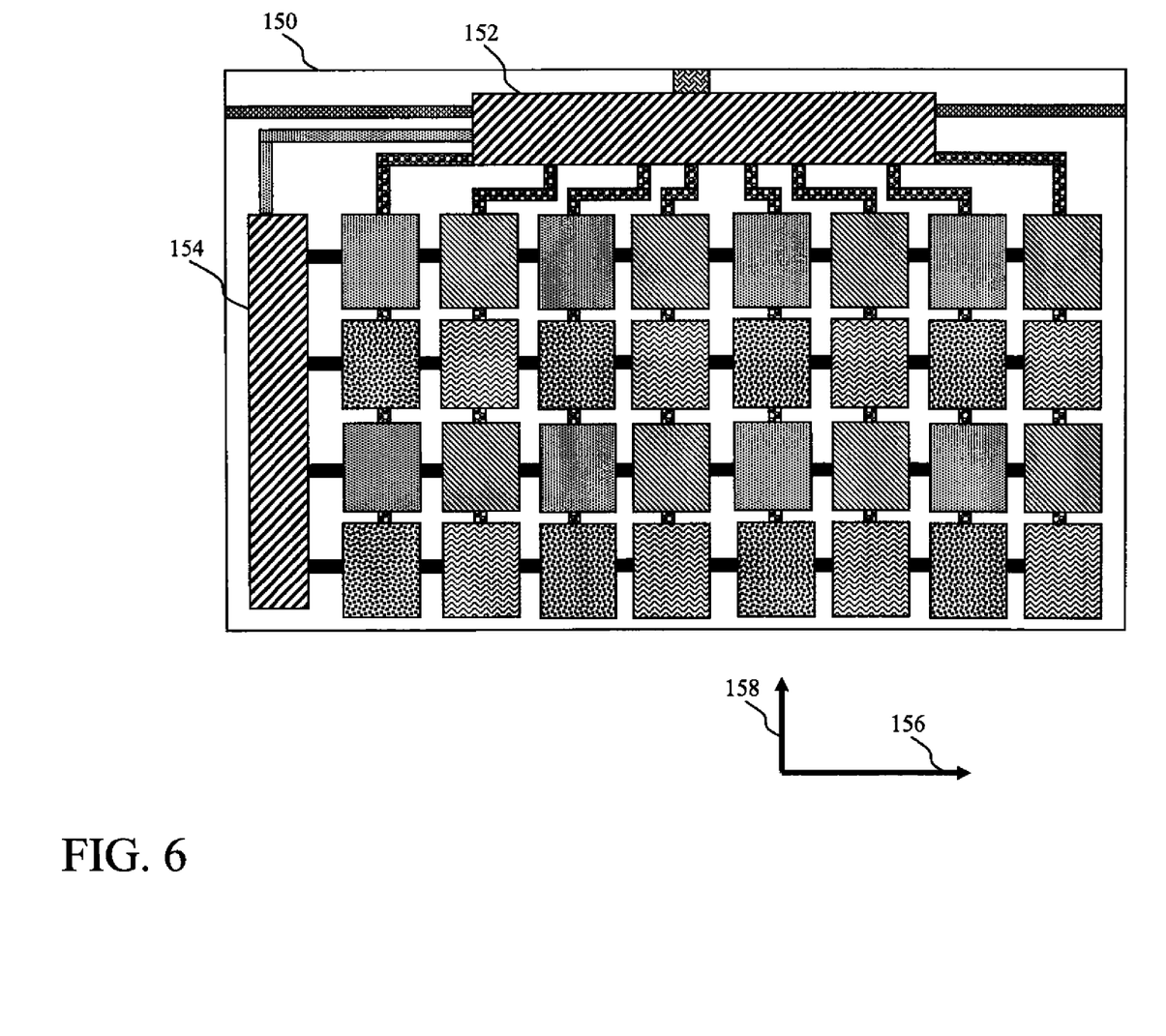
FIG. 6 is a schematic of a portion of a touch sensitive EL display according to an embodiment of the present invention.

FIG. 3 shows that chiplets 44a, 44b are each oriented with their long axis in the direction indicated by arrow 58b. As such, piezoelectric or other stress or strain gauges within the chiplets 44a, 44b are generally most sensitive to stress or strain that is induced by deforming the flexible substrate 42 in the direction indicated by arrow 58b and less sensitive to stress or strain that is induced by deforming the flexible substrate 42 in other directions, including the orthogonal direction indicated by arrow 58a. To increase the sensitivity of the chiplets to stress or strain in an alternate direction, some chiplets 44a, 44b are oriented with their long axis oriented in a different direction than other chiplets within some arrangements. One such arrangement is depicted in FIG. 6, which illustrates a portion 150 of a touch sensitive EL display of the present invention. This figure depicts a pair of chiplets 152 and 154. The long axis of chiplet 152 is oriented in the direction of arrow 156 and the long axis of the chiplet 154 is oriented in the perpendicular direction as indicated by arrow 158. In this configuration, these two chiplets 152, 154 are formed in the same region. Sensors within chiplet 152 are typically used to determine deflection of the flexible substrate in directions that lie primarily parallel to arrow 156, and sensors within chiplet 154 are typically used to determine deflection of the flexible substrate in directions that lie primarily parallel to arrow 158. As such, the first plurality of chiplets 152, 154 includes a first chiplet 152 having an axis oriented in a first direction as indicated by arrow 156 and a second chiplet 154 having an axis oriented in a second direction as indicated by arrow 158. In this configuration, the second direction is different from the first direction and each chiplet senses stress along its respective axis.

In some embodiments, the display device of the present invention will be associated in a game device which has a game object which can be manipulated by a user. The game device will further include an apparatus responsive to the location and force component within the touch signal 106 for controlling the game object, which is displayed on the display device of the present invention. This game device will further employ the location and force components to control different attributes of the game object. In one example, the game device can display an image of a pool table on the display device of the present invention as part of a game where this pool table includes balls typical of the game of pool, including a cue ball. The user can then place his or her finger on the cue ball and press the screen with a force. In response, the display device of the present invention will provide a touch signal 106 as shown in FIG. 5b to a higher level controller in the game. The game can then employ the touch location to determine the ball which is to be struck and the force component can be used to determine the relative force that was intended to be applied to the cue ball and update the image of the pool table on the display of the present invention in response to the touch location and relative force.

In another arrangement, the display device will be associated in a keyboard simulation object and will, for example, display an image of a piano or a computer keyboard. In such an embodiment, the keyboard simulation object will typically display the keys, respond to the location component in the touch signal 106 to determine the keys on which the user's fingers are rested and rely on the force components for separating finger touch locations from touch locations for the heals of the user's hands. As such, the display device 2 is associated in a keyboard simulation object. The keyboard simulation object further includes an apparatus responsive to the location and force components for identifying finger locations on the keyboard simulation object from other portions of the user's hands which are in contact with the keyboard simulation object.

Providing both a force component and a location component has a benefit in many potential applications. It has a significant benefit in the area of capturing and displaying handwriting. In many written languages, including Chinese writing, the width of a stroke can influence the interpreted meaning of a character containing the stroke. Further, when forming these written languages with traditional pens and pencils, the width of the stroke is typically controlled by controlling the force applied to the pen or pencil when writing on paper. In some applications the display device of the present invention will provide the same behavior in a device for recording and presenting writing.

Figure 7:
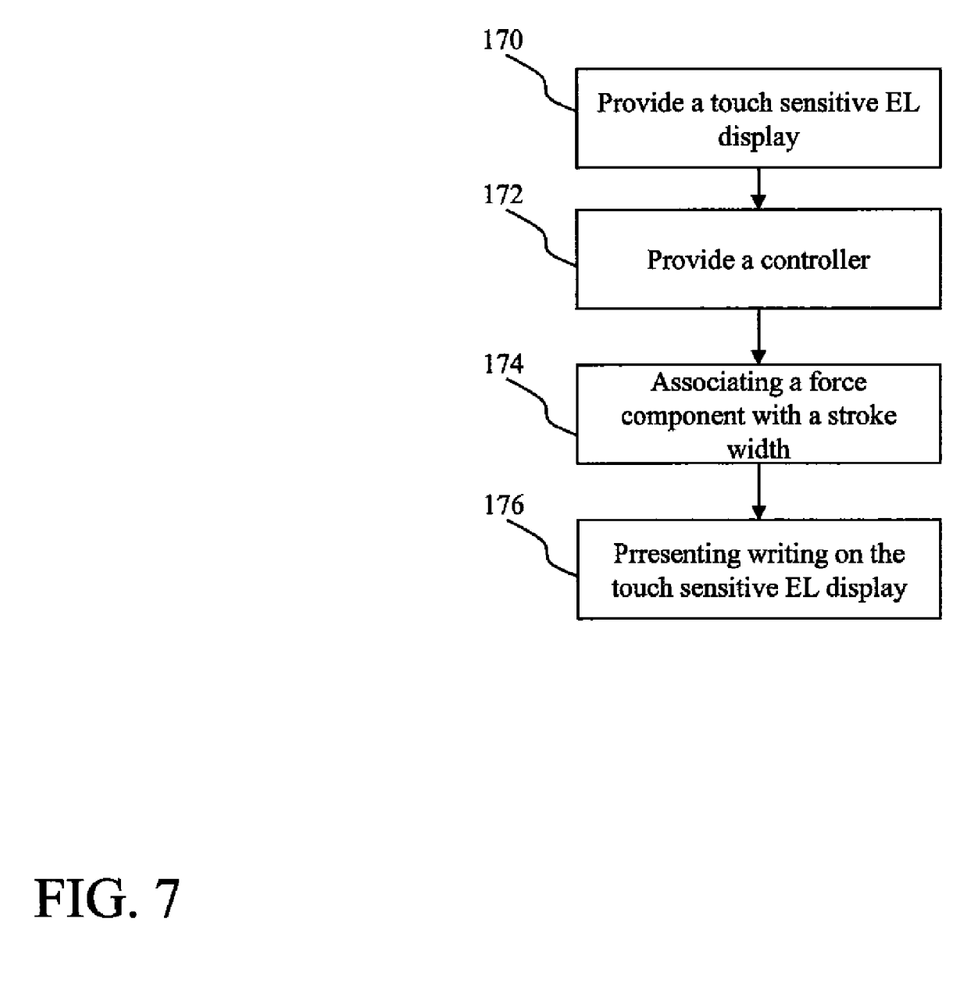
FIG. 7 is a flow chart showing a method for applying a display device of the present invention.

In one arrangement the display of the present invention is applied in a method as shown in FIG. 7. As shown in this figure, the method for using a display to present writing on the display includes providing 170 a touch sensitive EL display 4 as shown in FIG. 1. As discussed earlier, this touch sensitive EL display 4 will include a flexible substrate 10, one or more power busses 12 disposed over the flexible substrate, one or more EL elements 14 disposed over the flexible substrate for emitting light in response to an electrical signal, and a first plurality of distributed chiplets 16a, 16b. These chiplets 16a, 16b are arranged so that at least two chiplets are associated with each of a plurality of touch sensitive areas 26 on the touch sensitive EL display 4 and for sensing stress or strain associated with bending of the flexible substrate 10 to provide respective displacement signals 18 corresponding to the corresponding touch sensitive areas. Displacement signals 18 are interpolated or processed in other ways to triangulate the location or region having the peak bending force. The chiplets 16a, 16b are further connected to one or more of the power busses 12 and one or more of the EL elements 14 for modulating power from the power busses 12 in response to a corresponding control signal 22 to provide an electrical signal to the one or more EL elements 14.

A controller, for example controller 6 in FIG. 1, is additionally provided 172. This controller 6 provides control signals to the chiplets 16a, 16b in response to an input image signal 24 and receives displacement signals 18 from the chiplets 16a, 16b. This controller produces touch signals 8, as a function of the displacement signals 18, indicating the corresponding touch sensitive areas of the touch sensitive EL display 4 that have been touched wherein each touch signal 8 includes a location component and a force component. In this method, the controller 6, in response to the user touching the touch sensitive EL display 4, provides touch signals 8 representing the writing by the user and in response to the touch signals 8 provides control signals 22 causing the display to present 176 the writing. Within embodiments of this invention the user can cause a physical object, such as a stylus, to touch the display 4 to provide writing on the display 4 to which the controller 6 can respond to provide control signals causing the display to present the writing.

Within this method, the user writing provided on the touch sensitive EL display 4 will often include a plurality of strokes each having one or more locations and a desired width, wherein the one or more locations of each stroke are associated with the location components of a corresponding touch signal and the width of each stroke is associated with the force component of a corresponding touch signal. To accomplish this goal, the controller 6 can associate 174 a force component with a stroke width and presenting writing on the display having the associated stroke width.

The invention has been described in detail with particular reference to certain preferred embodiments thereof, but it will be understood that variations and modifications can be effected within the spirit and scope of the invention.

PARTS LIST 2 display device
4 touch sensitive EL display
6 controller
8 touch signals
10 flexible substrate
12 power buss
14 EL element
16a chiplet
16b chiplet
18 displacement signals
20 connector
22 control signals
24 image input signal
26 touch sensitive areas
28 chiplet
29 chiplet substrate
30 touch sensitive flexible EL display
32 optional compressible support surface
34 optional additional support substrate
40 portion of touch sensitive EL display
42 flexible substrate
44a, 44b chiplet
46 power buss
48 EL element
50 signal wire
52a, 52b strain gauge
54 electrical connector
58a, 58b arrows
60 chiplet
62 contact points
64 power buss contact point
66a, 66b signal wire contact point
68a, 68b strain gauge contact point
70 strain gauge circuit
72 piezoelectric component
74 temperature sensor
78 region
80 first controller portion
82 input image signal unit
84 receive input image signal unit
86 convert to linear intensity unit
88 process linear intensity unit
90 create drive signal unit
92 drive signal
94 estimate temperature per region unit
96 temperature signal
100 second controller portion
102 displacement signal
104 temperature signal
106 touch signal
108 receive displacement signal unit
110 displacement signal value
112 receive temperature signal unit s
114 temperature signal values
116 correct displacement signal unit
118 corrected displacement signal values
120 calculate relative displacement unit
122 reference displacement signal
124 displacement buffer
126 absolute displacement signal
128 threshold displacement signal unit
130 timing signal
132 displacement signal
134 assign location unit
136 coordinate signal
138 determine force unit
140 flag signal
142 determine touch location unit
144 location signal
146 force signal
148 provide force and touch unit signal
150 portion of touch sensitive EL display
152 first chiplet
154 second chiplet
156 first arrow
158 second arrow
170 provide touch sensitive EL display step
172 provide controller step
174 associate force step
176 present writing step

The invention claimed is:

1. A display device comprising:
   a) a touch sensitive EL display having:
      i) a flexible substrate;
      ii) one or more power busses disposed over the flexible substrate;
      iii) one or more EL elements disposed over the flexible substrate for emitting light in response to an electrical signal; and
      iv) a first plurality of distributed chiplets, each having a separate chiplet substrate, arranged so that at least two chiplets are associated with each of a plurality of touch sensitive areas on the EL display and for sensing stress or strain associated with bending of the flexible substrate or the chiplet substrate to provide respective displacement signals corresponding to the corresponding touch sensitive areas wherein each chiplet is connected to one or more of the power busses and one or more of the EL elements for modulating power from the power busses in response to a corresponding control signal to provide an electrical signal to the one or more EL elements; and b) a controller for providing control signals to the chiplets in response to an input image signal and for receiving displacement signals from the chiplets and producing touch signals indicating the corresponding touch sensitive areas of the touch sensitive EL display that have been touched.

2. The display device of claim 1, wherein each touch signal includes a location component and a force component.

3. The display device of claim 2, wherein the controller provides touch signals only when the force component is above a selected level.

4. The display device of claim 1, further including a plurality of distributed chiplets for modulating power from the power busses to provide an electrical signal to the one or more EL elements.

5. The display device of claim 1, wherein multiple chiplets include a piezoelectric component for measuring stress of the chiplet substrate to produce corresponding displacement signals.

6. The display device of claim 1, further including a plurality of strain gauges formed on the flexible substrate and wherein one or more of the strain gauges are connected to each chiplet for measuring strain of the flexible substrate.

7. The display device of claim 6, further including a single metal layer, and wherein the strain gauges and the power busses are formed in the single metal layer.

8. The display device of claim 1, wherein the first plurality of chiplets includes a first chiplet having an axis oriented in a first direction and a second chiplet having an axis oriented in a second direction different from the first direction, wherein each chiplet senses stress along its respective axis.

9. The display device of claim 1, wherein the flexible substrate is divided into one or more regions, each region includes one or more of the plurality of chiplets, and at least one chiplet in each region includes a temperature sensor for determining the temperature of the flexible substrate; and wherein the touch signals are corrected for variations in temperature.

10. The display device of claim 9, wherein the at least one chiplet in each region provides a temperature signal corresponding to the temperature of the flexible substrate and the controller, responsive to the temperature signal, employs the temperature signal to provide touch signals that are corrected for variations in temperature.

11. The display device of claim 9, wherein the at least one chiplet in each region determines a temperature signal corresponding to the temperature of the flexible substrate and adjusts the displacement signals corresponding to the corresponding touch sensitive areas before the displacement signals are provided to the controller to provide touch signals that are corrected for variations in temperature.

12. The display device of claim 1, wherein the flexible substrate is divided into one or more regions, each region includes one or more of the plurality of chiplets, and the controller further includes estimating means responsive to the input image signal for estimating a temperature of the flexible substrate in each region and providing a corresponding temperature signal, wherein the controller employs the temperature signals to provide the touch signals that are corrected for variations in temperature.

13. The display device of claim 1, further including a rigid support adjacent to the flexible substrate.

14. The display device of claim 1, wherein the controller simultaneously detects multiple touches on different touch sensitive areas.

15. The display device of claim 1, wherein the controller applies a spatial filter to the displacement signals.

16. The display device of claim 1, being associated in a game device having a game object and further including means responsive to the location and force component for controlling the game object, wherein the location and force components control different attributes of the game object.

17. The display device of claim 1, being associated in a keyboard simulation object and further including means responsive to the location and force components for identifying finger locations on the keyboard simulation object from other portions of the user's hands.

18. A method for using a display to present writing on the display comprising:
    a) providing a touch sensitive EL display having:
        i) a flexible substrate;
        ii) one or more power busses disposed over the substrate;
        iii) one or more EL elements disposed over the substrate for emitting light in response to an electrical signal; and
        iv) a first plurality of distributed chiplets arranged so that at least two chiplets are associated with each of a plurality of touch sensitive areas on the EL display and for sensing stress or strain associated with bending of the substrate to provide respective displacement signals corresponding to the corresponding touch sensitive areas wherein each chiplet is connected to one or more of the power busses and one or more of the EL elements for modulating power from the power busses in response to a corresponding control signal to provide an electrical signal to the one or more EL elements;
    b) providing a controller for providing control signals to the chiplets in response to an input image signal and for receiving displacement signals from the chiplets and producing touch signals indicating the corresponding touch sensitive areas of the display that have been touched wherein each touch signal includes a location component and a force component; and
    c) a user causing a physical object to touch the display to provide writing on the display and the controller in response to the user touching the display providing touch signals representing the writing by the user and in response to the touch signals providing control signals causing the display to present the writing.

19. The method of claim 18, wherein the physical object is a stylus.

20. The method of claim 18, wherein the writing on the display includes a plurality of strokes each having one or more locations and a width, wherein the one or more locations of each stroke are associated with the location components of a corresponding touch signal and the width of each stroke is associated with the force component of a corresponding touch signal.

* * * * *